Figure 1:
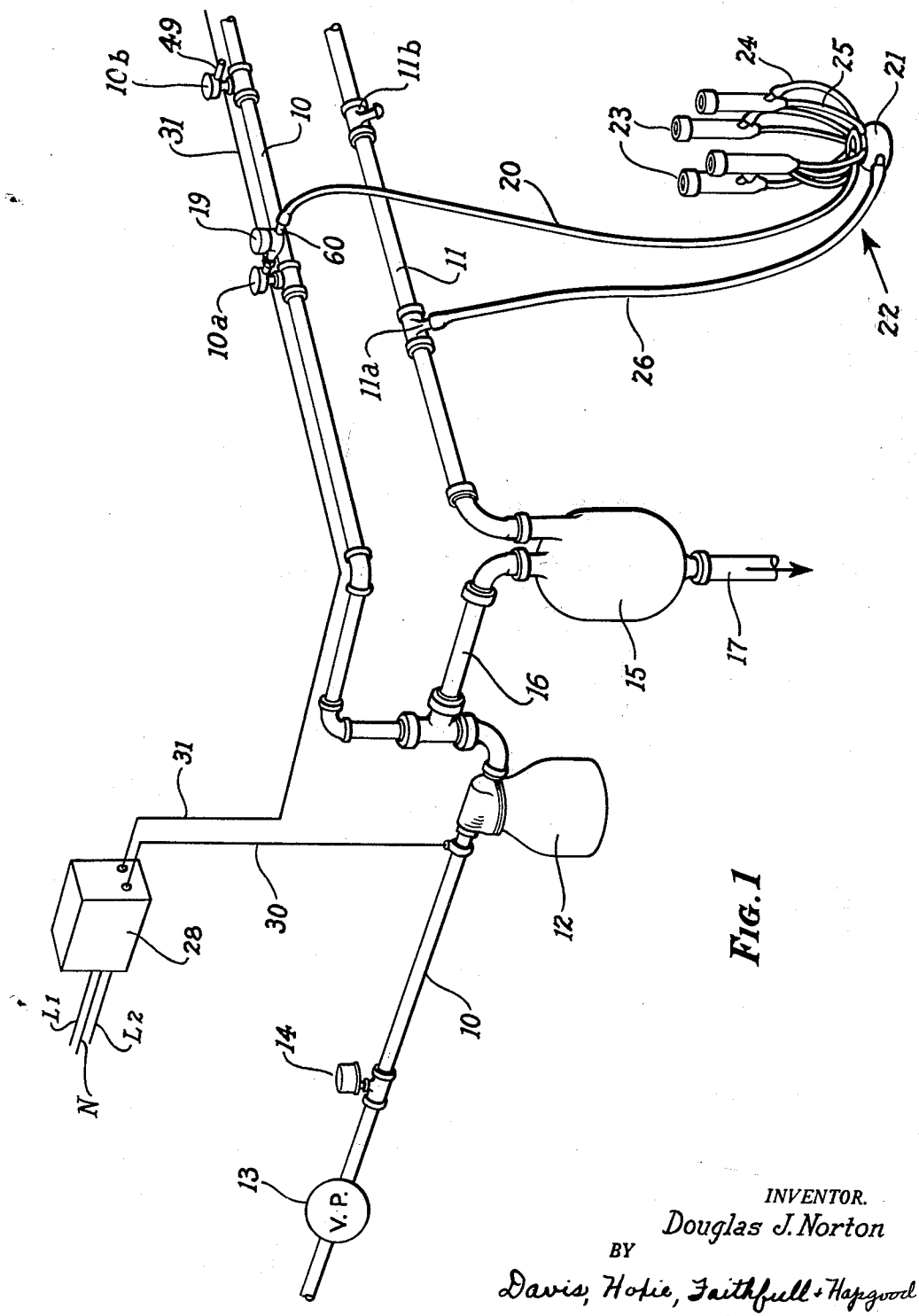

March 9, 1965

D. J. NORTON 3,172,391

HIGH SPEED MILKING SYSTEM

Filed Sept. 28, 1962

3 Sheets-Sheet 1

INVENTOR.
Douglas J. Norton
BY
Davis, Hoxie, Faithfull & Hapgood
ATTORNEYS.

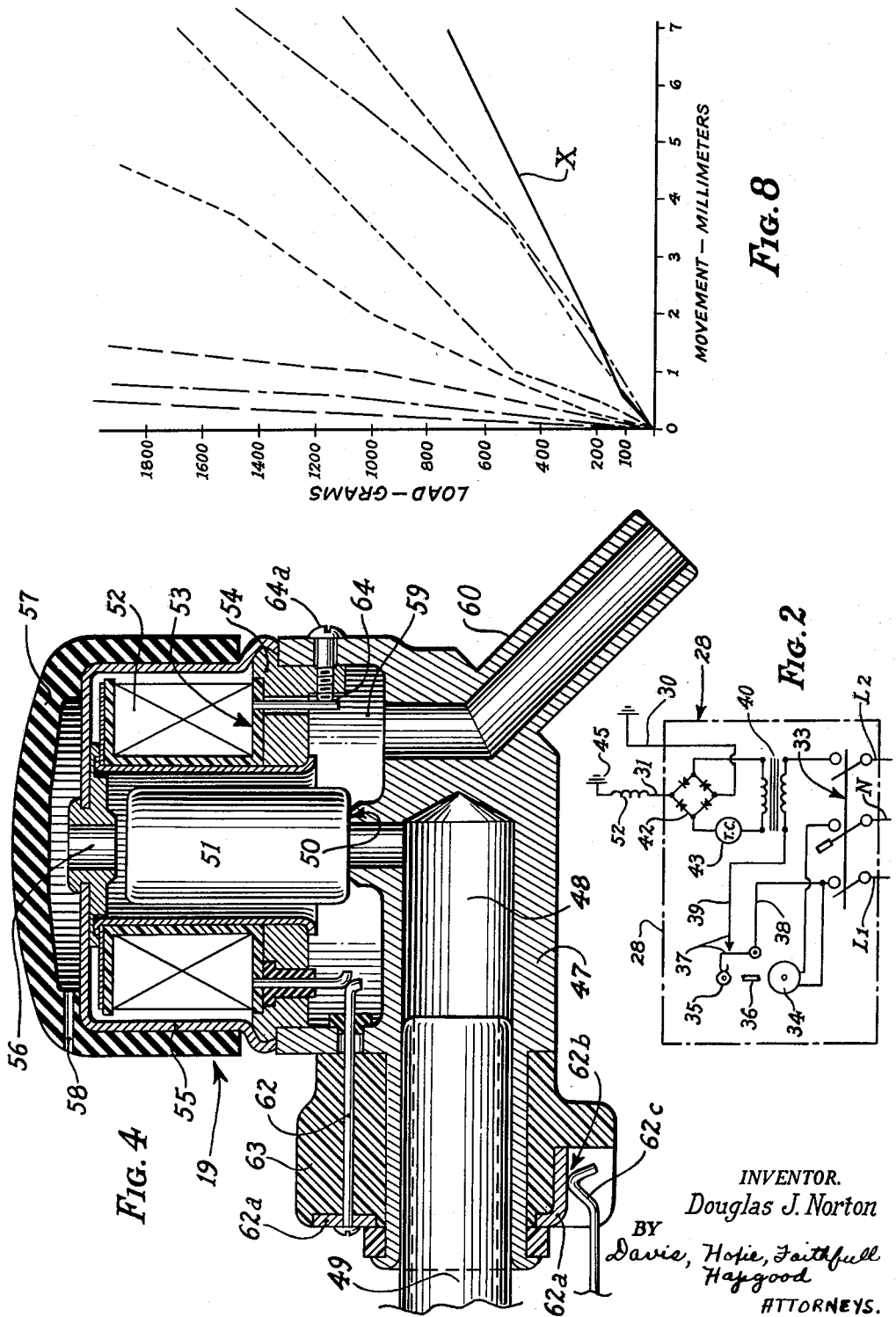

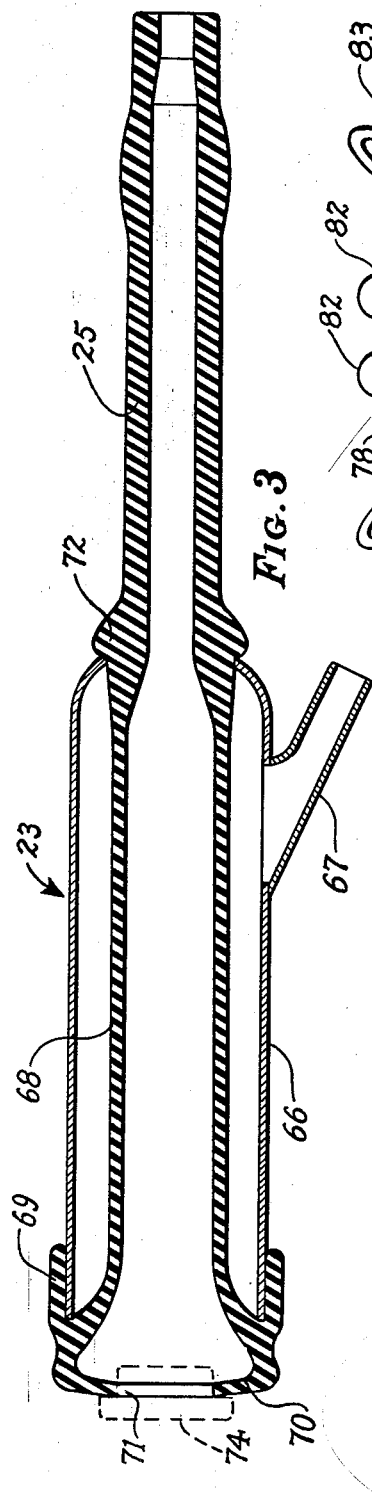
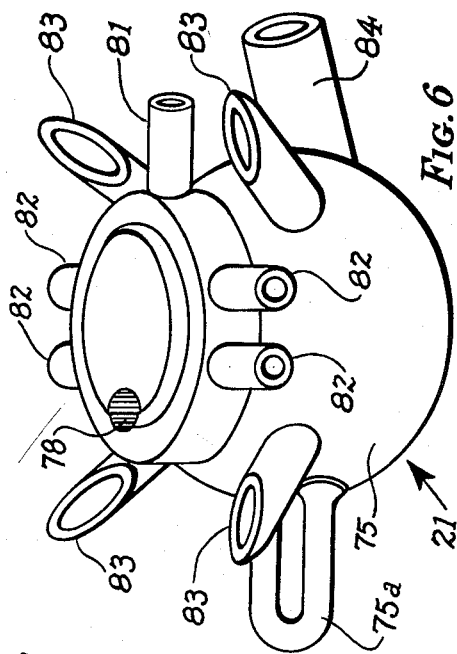
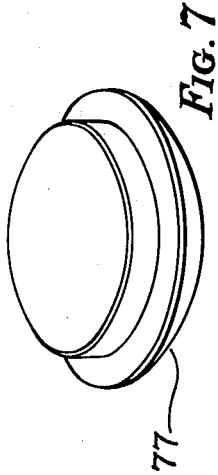
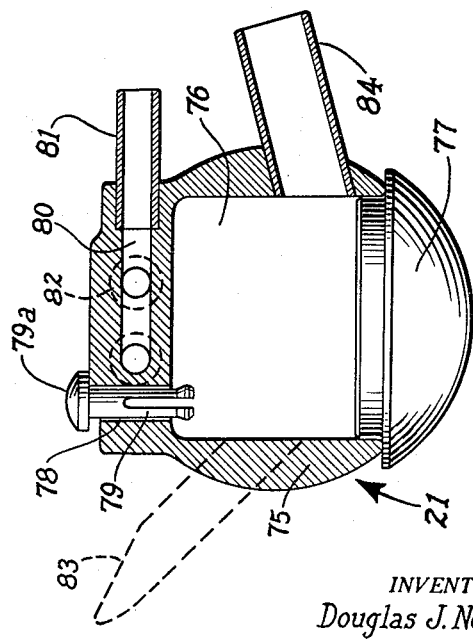
INVENTOR.
Douglas J. Norton

United States Patent Office 3,172,391
Patented Mar. 9, 1965

3,172,391
HIGH SPEED MILKING SYSTEM
Douglas J. Norton, Red Hook, N.Y., assignor to The De Laval Separator Company, Poughkeepsie, N.Y., a corporation of New Jersey
Filed Sept. 28, 1962, Ser. No. 227,028
6 Claims. (Cl. 119—14.28)

This invention relates to milking apparatus of the type in which the milk is drawn under vacuum from the cow's teats by the action of pulsations which are effected through the alternate application of atmospheric pressure and a vacuum to an enclosed space surrounding each teat. More particularly, the invention relates to milking apparatus of the type described in which the milking can be performed rapidly without adversely affecting the cow.

Milking apparatus of the vacuum type, as commonly made, includes a vacuum pipe line, a set of teat-cups connected to the vacuum line through a milk claw, and a pulsator for alternately connecting enclosing spaces surrounding the teats to the vacuum line and then to atmosphere. Apparatus of this vacuum type affords definite advantages through mechanized milking as compared with hand milking. However, the milking art has very naturally sought to increase the efficiency of such apparatus in terms of the time period required to complete the milking of the cows served by the apparatus.

Various measures have been proposed for increasing the efficiency of the vacuum milking apparatus. Among these measures is to increase the rate of the pulsations applied to the cow's teats, and to provide pulsations which increase the period of the vacuum application, to the enclosed spaces surrounding the teats, in relation to the period of atmospheric pressure application to such spaces, the theory being that the cow can be milked most rapidly by increasing this ratio to as much as 4:1. While such a ratio increase has been found to provide more rapid milking of the cow, it has also been found to result in adverse effects upon the cow, particularly with respect to its milk yield and the general well-being of the cow.

I have discovered that rapid milking of the cow with vacuum apparatus of the type described, without adverse effect upon the cow, is dependent upon proper correlation of several factors, as follows:

(a) The degree of vacuum maintained in the vacuum pipe line.
(b) The nature of the teat-cups and particularly their liners and the flexibility of their mouthpieces which define the restricted teat-receiving openings.
(c) The volumetric capacity of the milk claw chamber which receives the milk from the teat-cup liners by way of the usual milk tubes.
(d) The pulsation frequency provided by the pulsator, and
(e) The ratio which the pulsator provides between the time period in which the enclosed spaces surrounding the teat-cup liners are subjected to vacuum and the time period in which such spaces are subjected to atmospheric pressure.

More particularly, I have found that such rapid milking without adverse effect is obtained if:

(1) The degree of vacuum is maintained between 12 and 20 inches of mercury, preferably 15 inches.
(2) The teat-cups are provided with liners having mouthpieces with a flexibility such that a force of 600 grams, applied axially to the margin of the mouthpiece opening, results in axially deflecting such margin at least 4½ millimeters, preferably 5 to 7 millimeters.
(3) The volumetric capacity of the milk claw chamber is at least 3.35 cubic inches, preferably 4 to 8 cubic inches.
(4) The pulsation frequency is 50 to 70 cycles per minute, preferably 60 cycles.
(5) The aforesaid ratio is between 2:1 and 3:1, preferably 2½:1.

Tests have shown that with the system of the present invention, wherein the above-noted limitations are embodied, the time required for each milking of the cows is greatly reduced (as much as 33% less than the time required with conventional milking systems), and yet there is no adverse effect upon the cows, either in their milk yield or their general health. Thus, the savings enabled by the present invention are very substantial.

For a better understanding of the invention, reference may be had to the accompanying drawings, in which:

FIG. 1 is a schematic view of a preferred milking system according to the invention;
FIG. 2 is a wiring diagram of the timer for controlling the pulsator of the system;
FIG. 3 is an enlarged longitudinal sectional view of one of the teat cups shown in FIG. 1;
FIG. 4 is an enlarged vertical sectional view of the electromagnetic pulsator shown in FIG. 1;
FIG. 5 is an enlarged vertical sectional view of the milk claw shown in FIG. 1;
FIG. 6 is a perspective of claw shown in FIG. 5, with the air inlet member and bottom closure cap removed;
FIG. 7 is a perspective view of the bottom closure cap shown in FIG. 1; and
FIG. 8 is a diagram showing the load-deflection relationship with respect to the mouthpiece flange of the liner of one of the teat-cups shown in FIG. 1.

Referring to FIG. 1, the system there shown comprises a vacuum pipe line 10 and a milk pipe line 11. The vacuum line 10 includes a moisture trap 12 and is maintained under vacuum by means of a vacuum pump 13. A vacuum regulator 14, which may be as disclosed in Scott Patent No. 2,613,759 dated October 14, 1952, is connected to line 10 near the pump and serves to prevent excessive vacuum in line 10 by admitting air thereto when the vacuum exceeds a predetermined value which is to be maintained. The regulator 14 is set to maintain a vacuum of between 12 and 20 inches of mercury and preferably a vacuum of about 15 inches of mercury.

The milk line 11 is connected to the upper portion of a milk receiving jar 15. From the top of this jar, a pipe 16 extends to the vacuum line 10 so as to provide a vacuum in jar 15. A pipe 17 extends from the lower portion of jar 15 for leading the milk to storage or further processing, it being understood that the milk is drawn from the jar through discharge pipe 17 in a conventional manner by applying a vacuum to the ultimate receiver (not shown) to which pipe 17 leads.

The vacuum pipe line 10 is provided at spaced intervals with stall cocks 10a and 10b which may be of conventional design. Similarly, the milk pipe line 11 is provided at spaced intervals with milk cocks 11a and 11b which may be of conventional design. Each milking unit to be described presently is connected to one stall cock and one milk cock; and while I have shown only two sets of these cocks, it will be understood that any desired number may be provided depending upon the number of milking locations to be served by the system.

An electromagnetic pulsator 19 is connected to the stall cock 10a by means of a nipple 49 of the latter and has a nipple 60 by which the pulsator is connected to an air hose 20 leading to the milk claw 21 of a milking unit 22. The milking unit comprises four teat cups 23 connected by respective air tubes 24 to the milk claw 21 and also connected by respective milk tubes 25 to this claw. At its lower portion, the milk claw 21 is connected by a milk hose 26 to the milk cock 11a in the milk line 11.

The pulsator 19 operates in the usual manner through hose 20 and tubes 24 to alternately apply a vacuum and release this vacuum in the spaces surrounding the liners or inflations in the teat cups 23, while the vacuum maintained in receiving jar 15 draws the milk into the jar by way of the milk tubes 25 and the milk hose 26. The pulsations of the pulsator 19 are controlled by a timer 28 operated from an electric power line L1–N–L2. The timer 28, to be described in more detail presently, serves to apply a pulsating direct current across two conductors 30 and 31. The conductor 30 is grounded by connection to vacuum pipe line 10. The conductor 31 is connected to the coil 52 (FIG. 4) of each of the electromagnetic pulsators 19 and thence to ground, so that the electromagnetic coil of the pulsator is alternately energized and deenergized by the timer 28.

The timer 28, as shown in FIG. 2, comprises a manually operable switch 33 which, when closed, connects an an electric motor 34 across lines L1 and N to energize the motor at 115 volts. Motor 34 is of the constant speed type and preferably operates at 60 r.p.m. It drives a cam 35 through a shaft or other driving connection 36. Cam 35 operates a switch 37, one side of which is connected by wire 38 through switch 33 to power line L1. The other side of switch 37 is connected by wire 39 through the primary winding of a transformer 40 and through switch 33 to the power line L2. Thus, with the operating switch 33 closed, the transformer primary is alternately energized and deenergized at 230 volts, under the action of the cam-actuated switch 37.

A rectifier 42 is connected across the secondary of transformer 40. For safety purposes, a cut-out switch 43 of the thermal type is included in the rectifier input circuit. The rectifier 42 delivers direct current at 12 volts. One side of this output is grounded by the wire 30 while the other side is connected to the wire 31 leading to one side of the electro-magnetic coil 52 of each pulsator 19. As shown schematically in FIG. 2, the other side of coil 52 is grounded at 45 to complete the circuit through the coil.

As shown in FIG. 4, the pulsator 19 comprises a main metallic body 47 having a longitudinal passage 48 adapted to receive the nipple 49 of the corresponding stall cock 10a. At its inner end, passage 48 opens upwardly through a valve seat 50 into a chamber 59. An armature 51 forming a valve element normally rests on the seat 50 to close chamber 59 from passage 48 and thus from vacuum line 10. An electromagnetic coil 52 surrounds the armature 51 in spaced relation thereto and is located in an insulating spool 53 seated on an annular disc 54. The latter is seated on the upper part of body 47 where it is suitably secured to the body 47. A housing member 55 is crimped around disc 54. The top of housing 55 is provided with a central opening 56 which, upon energizing the coil 52, is closed by the armature valve 51. A removable cap 57 rests on top of housing 55 and has a skirt surrounding the housing. The cap is formed with an air inlet channel or passage 58 leading to a space between the top of housing 55 and the undersurface of cap 57. A nipple 60 forms a passage leading from chamber 59 and, as previously mentioned, is connected to the air hose 20. An electrically conductive pin 62 extends through an insulating collar 63 surrounding the outer portion of passage 48. This pin 62 is electrically connected at its inner end to one side of the coil 52 and engages at its outer end a metal clip 62a which is adapted to mate at 62b with a clip 62c having an insulated mounting on stall cock 10a. This stall cock is of the type disclosed in Scott Patent No. 2,251,071 dated July 29, 1941, in which the conductive clip 21 corresponds to clip 62c in FIG. 4, the latter being connected to conductor 31. The other side of coil 52 is electrically connected to disc 54, as shown at 64, and disc 54 is secured by screw 64a to body 47. Thus, this other side of coil 52 is grounded through stall cock 10a to complete the circuit back to wire 30.

With the armature valve 51 seated, as shown in FIG. 4, the air hose 20 is connected to amosphere through nipple 60, chamber 59, the housing opening 56 and air inlet passage 58. When coil 52 is energized armature valve 51 is raised from its seat 50 and closes the air inlet opening 56, thereby connecting the air hose 20 to vacuum line 10 through passage 48 and stall cock 10a. De-energizing of coil 52 allows armature valve 51 to return by gravity to its initial position so that the air hose is again vented to atmosphere.

The timer cam 35 (FIG. 2) is so shaped that the period during which the pulsator coil 52 remains energized is about 2½ times the period during which it remains deenergized. Consequently, with the time motor 34 operating at a speed of 60 r.p.m., the air hose 20 is connected to vacuum line 10 for a period of about 0.7 second and is then connected to atmosphere for a period of about 0.3 second, whereupon it is then connected again to the vacuum line for a period of about 0.7 second, and so on.

Each teat-cup 23, as shown in FIG. 3, comprises a metal shell 66 having a nipple 67 for connection to the corresponding air tube 24 which, through claw 21 to be described in more detail presently, is connected to air hose 20. Within the shell 66 is a rubber or rubber-like inflation or liner 68. At its upper portion, liner 68 has a flange 69 closely surrounding the open upper end of shell 66, this shell end being seated against a shoulder of the liner within flange 69. The interior of liner 68 is generally cylindrical and is gradually enlarged at the upper end portion of the liner. The upper end of the latter is provided with an integral mouthpiece 70 extending radially inwardly from the liner periphery and defining a teat-receiving opening 71. At its lower end, which is also open, the shell 66 is seated against an annular shoulder 72 of liner 68. The shell length and the spacing of the liner shoulders engaging the opposite ends of the shell are such that the barrel part of the liner between these shoulders is maintained under a tension of 15 to 25 pounds. The milk tube 25 is integral with liner 68 and extends downwardly from shoulder 72, the lower end of the milk tube being adapted for connection to a corresponding nipple on the milk claw 21.

An important feature of the teat-cups 23 is the degree of flexibility of their mouthpieces 70. I have found that if this flexibility is insufficient, the teat-cup tends to creep on the cow's teat under the operating conditions of the present system, thereby impairing the milking operation and resulting in discomfiture of the cow. To avoid such creep, the mouthpiece flange 70 should have a flexibility such that its margin around the opening 71 will deflect axially of the liner through a distance of at least 4½ millimeters when a force of 600 grams is applied against the margin in the axial direction. This determination can be made by inserting a flanged plug 74 (FIG. 3) into the opening 71 so that the reduced part of the plug fits closely in this opening while the plug flange engages the outer surface of the mouthpiece 70 around the opening, then applying the force of 600 grams to the center of the plug (from the outside) and in the axial direction toward the milk tube 25, and accurately measuring the resulting axial deflection of the plug 74.

Referring to FIG. 8, the line x represents the force-deflection characteristic of the mouthpiece 70. As will be observed from the line x, the deflection determined as described above is 5.5 millimeters with application of the force of 600 grams and is 7 millimeters with application of a force of 750 grams. The other lines on the diagram of FIG. 8 represent the force-deflection characteristics (similarly determined) of the mouthpieces of other teat-cup liners in commercial use; and it will be observed from a comparison of line x with these other lines that the flexibility of the mouthpiece of the liner used in the present system is substantially greater than that of the mouthpiece of these other commercial liners.

As shown in FIGS. 5, 6 and 7, the milk claw 21 comprises a hollow body 75 of generally spherical form having a generally square chamber 76. This chamber is open at its lower end but is normally closed by a bottom cap 77 having a press fit in the lower portion of the chamber. The top of the claw body 75 is provided with an air inlet port 78 in which a pin 79 is loosely fitted, this pin having a head 79a resting on top of the claw body. A horizontal channel 80 in the top of body 75 is connected through a nipple 81 to the air hose 20 leading from pulsator 19. The channel 80 has two branches extending from each side of this channel and leading to respective horizontal nipples 82 which are adapted for connection to the air tubes 24 leading to the respective teat-cups 23. The claw body 75 is provided with four upwardly inclined nipples 83 forming passages from the claw chamber 76, the nipples 83 being spaced uniformly around the claw body and being adapted for connection to the milk tubes 25 of the respective teat-cups 23. The function of the port 78 is to admit air at a limited rate into chamber 76 so as to facilitate flow of milk from the teat-cups through a nipple 84 adapted for connection to the milk hose 26 leading to the milk cock 11a of the milk pipe line. A bail 75a on the claw body 75 serves for hanging the milk claw when it is not in use.

The volumetric capacity of chamber 76 in milk claw 75 is also an important factor in the operation of the present system, as it should be sufficient to accommodate continuously in the increased rate of milk flow from the cow's teats without flooding of the chamber and yet should not be of such large capacity that the milker unit 22 imposes excessive weight or "drag" on the cow's teats from which the unit is suspended. I have found that the volumetric capacity of claw chamber 76 should be at least 3.35 cubic inches and preferably about 5 but not more than 8 cubic inches.

It will be understood that the teat-cup shells 66 form enclosed annular clearance spaces around the corresponding barrel portions 68 of the liners; and the pulsator 19 and its associated timer 28 form pulsator means for alternately connecting these clearance spaces in unison to vacuum line 10 and then to atmosphere at a rate of about 60 cycles per minute. The timer cam 35 of this pulsator means, and its associated switch 37, form a control device which maintains a ratio of about 2½:1 between the period of such connection to the vacuum line and the period of such connection to atmosphere in each cycle. This frequency and ratio, in combination with the aforementioned volumetric capacity of the milk claw chamber 76 and the aforementioned flexibility characteristic of the liner mouthpiece flanges 70, afford the optimum in the previously described advantages of my system.

The stall cocks 10a–10b may be of the well-known type which automatically opens a contained valve (not shown) leading to vacuum line 10 when the pulsator 19 is applied to nipple 49, and automatically closes this valve when the pulsator is detached from nipple 49.

I claim:

1. A vacuum milking system comprising in combination: a vacuum pipe line, means for maintaining a vacuum of 12 to 20 inches of mercury in said line, a set of four teat-cup liners of rubber-like material each including a generally cylindrical barrel having upper and lower end portions and a mouthpiece flange at the upper end portion of the barrel extending radially inward to define a central opening for closely receiving a teat, each flange having a limited flexibility such that a pressure of 600 grams exerted axially thereon at the margin of said opening causes said margin to deflect axially through a distance of at least 4.5 millimeters, a teat-cup shell surrounding ecah liner barrel and including means engaging the upper and lower end portions of the barrel to hold the same stretched axially under a tension of 15 to 25 pounds, each shell forming an annular clearance space around the corresponding barrel intermediate its ends, a milk tube extending from the lower end of each liner barrel, a milk claw connected to the four milk tubes and having a milk-receiving chamber with a volumetric capacity of at least 3.35 cubic inches to which said tubes lead, the claw also having a milk outlet leading from said chamber, means connecting said claw outlet to the vacuum pipe line and including a milk-receiving vessel, pulsator means for alternately connecting said clearance spaces in the four shells in unison to said vacuum line and then to atmosphere, and a control device connected to the pulsator means to operate the pulsator means at a rate of 50–70 cycles per minute while maintaining a ratio of from 2:1 to 3:1 between the period of said connection to the vacuum line and the period of said connection to atmosphere in each cycle.

2. A system according to claim 1, in which said chamber has a volumetric capacity of 4 to 8 cubic inches.

3. A system according to claim 1, in which said vacuum maintaining means maintains a vacuum of about 15 inches of mercury in said line.

4. A system according to claim 1, in which said axial deflection of the flange is through a distance of 5 to 6 millimeters.

5. A system according to claim 1, in which the period of said connection to the vacuum line is about 0.7 second and the period of said connection to atmosphere is about 0.3 second.

6. A system according to claim 1, in which said chamber has a volumetric capacity of 4 to 6 cubic inches, said vacuum maintaining means maintains a vacuum of about 15 inches of mercury in said line, said axial deflection of the flange is through a distance of 5 to 6 millimeters, the period of said connection to the vacuum line is about 0.7 second, and the period of said connection to atmosphere is about 0.3 second.

References Cited in the file of this patent

UNITED STATES PATENTS

| | | |
|---|---|---|
| 2,039,421 | Jansson | May 5, 1936 |
| 2,559,035 | Wall | July 3, 1951 |
| 2,574,063 | Richwine | Nov. 6, 1951 |
| 2,655,168 | Henrard | Oct. 13, 1953 |
| 2,667,856 | Heckendorf | Feb. 2, 1954 |
| 2,687,112 | Shurts | Aug. 24, 1954 |
| 2,794,420 | Recchia | June 4, 1957 |
| 2,929,354 | Stevens | Mar. 22, 1960 |